No. 660,051. Patented Oct. 16, 1900.
J. R. CROFT.
MEANS FOR FACILITATING HERMETIC SEALING OF TINS OR OTHER RECEPTACLES.
(Application filed Aug. 6, 1900.)
(No Model.)
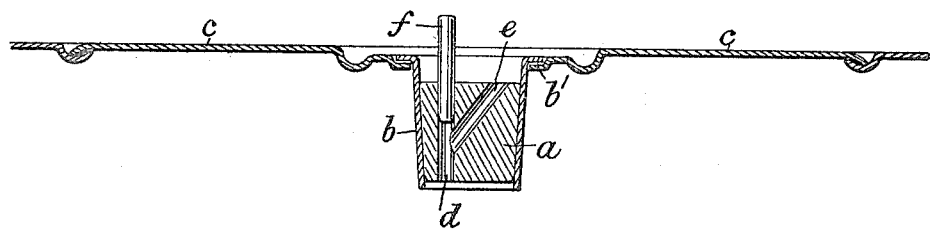
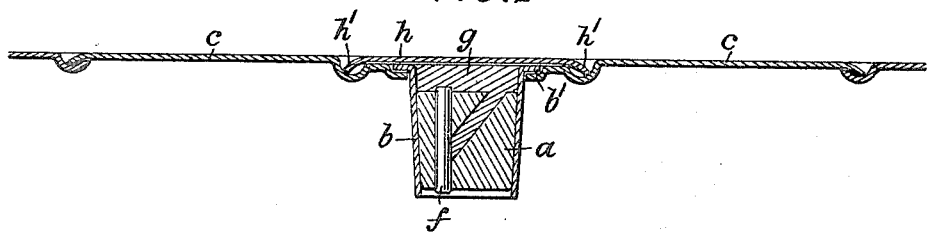
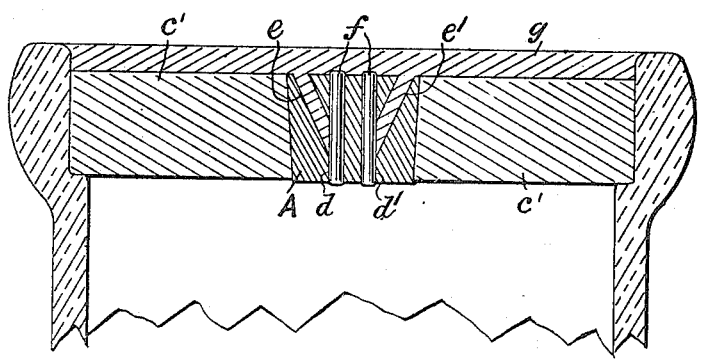
Witnesses.
Inventor:
John R. Croft.
By
Attorneys.

UNITED STATES PATENT OFFICE

JOHN R. CROFT, OF LONDON, ENGLAND.

MEANS FOR FACILITATING HERMETIC SEALING OF TINS OR OTHER RECEPTACLES.

SPECIFICATION forming part of Letters Patent No. 660,051, dated October 16, 1900.

Application filed August 6, 1900. Serial No. 26,010. (No model.)

*To all whom it may concern:*

Be it known that I, JOHN RADCLIFFE CROFT, merchant, a subject of the Queen of Great Britain, residing at 20 Mark Lane, in the city of London, England, have invented new and useful Improvements in Means for Facilitating the Hermetic Sealing of Tins or other Receptacles Containing Alimentary or other Products, of which the following is a specification.

My invention relates to tins or other vessels for the preservation of alimentary or other products, and has for its object to provide a simple and efficient means of sealing the tin or vessel, the invention being applicable for sealing tins or other receptacles for alimentary or other substances which are to be preserved without cooking by the extraction of the contained air and its replacement by an inert gas or by melted fat, the invention being also applicable in preserving alimentary substances by expelling the contained air by boiling the contents in their own juices or in water.

The invention consists, essentially, of a means whereby a preliminary or interim sealing may be rapidly effected at the proper moment and in the combination therewith of a means of final sealing whereby the hermetic closure is rendered permanent.

The means of preliminary closure comprise a bush or bung seated in the top or cover of the vessel and having a straight through-passage and a branch passage leading obliquely into the through-passage from the outside and a wooden plug fitted in the through-passage and adapted when driven in to close both the through and the branch passage.

It further comprises the combination, with the interim or preliminary seal, of a final seal to be applied after the plug has been driven in, as hereinafter described.

Reference is to be had to the accompanying drawings, forming part of this specification, wherein I have illustrated the invention on a magnified scale.

Figure 1 shows a central vertical section of the bush as applied to the cover of a tin, the branch passage being open. Fig. 2 shows the same with the plug driven in to close the passage and the final seal applied. Fig. 3 shows the bush as applied to the cork stopper of a wide-mouthed bottle or jar.

Referring to Figs. 1 and 2, $a$ is the bush or bung, preferably of wood and of slightly-conical form, tightly fitted in a correspondingly-shaped seat $b$, formed of a flanged tube soldered at $b'$ into an aperture in the top or cover $c$ of the tin or vessel, the tube being preferably conical and seamless. $d$ is a through-passage, and $e$ a branch passage leading obliquely into the passage $d$. $f$ is the plug, fitting in passage $d$ and adapted to be driven so far into the passage $d$ as to close the inner end of branch passage $e$ at its point of junction with the through-passage $d$, so that the thoroughfare is entirely closed, as shown in Fig. 2. In order to insure a tight closure, the bush after being driven into its seat should be well boiled in water, (or in oil or paraffin-wax when inert gas is to be used,) so as to swell the bush and expel any contained air from the wood. The bush may, however, be made of other material, and when fitted to a metal cover, such as $c$, it might be made of metal and be soldered to the cover $c$.

In Fig. 3, $c'$ is the cork bung, (closing a wide-mouthed bottle or jar,) in which a hole is punched to form a seat, into which a bush A is driven tightly. In this case the bush A is provided with two through-passages $d$ $d'$ and two branch passages $e$ $e'$, leading into $d$ $d'$, respectively, and with two plugs $f$, adapted to be driven in by the same blow for closing the injection and escape orifices simultaneously. In this case also the cork and bush should be boiled before use to expel contained air and insure a tight fit.

The preliminary sealing having been effected by driving in the plug $f$, as above described, affords a hermetic closure until the final sealing, which may be performed at leisure and by which the hermetic closure is rendered permanent. The final sealing is effected by applying a covering-layer of impermeable material, such as paraffin-wax or (in the case of a tin) melted solder, which is run into a recess left for its reception by slightly countersinking the bush into its seat, as in Fig. 1. In Fig. 2, $g$ is the layer of wax or solder, which adheres to the sides of the seat $b$ (a flux being used in the case of solder)

and closely covers the bush and plug, so as to effectually exclude air therefrom. When paraffin-wax is used, it may be protected by a covering-disk $h$, soldered by its edges $h'$ to the cover $c$ of the tin.

In the case of a bottle or jar paraffin-wax would be used to cover the bush and also the cork, which would be slightly countersunk in the mouth of the bottle or jar to receive the wax, as shown in Fig. 3.

In preserving by means of inert gas the tin may be provided with two bushes, such as in Fig. 1, the one in the top and the other in the bottom, or with a bush having double passages and plugs, as in Fig. 3, this form of bush being necessarily used in the case of a bottle or jar. The receptacle having been filled with the goods to be preserved and closed, with the exception of the branch passages $e$, it is placed in a chamber, which is first exhausted of air and then filled with an inert gas, by which the air extracted from the tissues of the contents and from the receptacle is replaced. The nozzle of a gas-supply pipe is then fitted into the one branch passage $e$ and gas is forced through the can to displace any air that may have reëntered, and while the gas is still passing both the plugs $f$ are driven in simultaneously, thus closing both passages $e$ and effectually preventing the escape of gas or the entry of air.

In preserving by means of fat a bush with double passages and plugs, as in Fig. 3, would be used. The air would be extracted from the tissues as before, and then the air which reënters the receptacle on removal from the vacuum-chamber would be displaced by liquid (animal or vegetable) fat forced in through the one passage $e$, both plugs being then closed as before.

In preserving food by boiling the contents in its own juices or in water to expel the air by the steam generated the bush with a single straight and branch passage and a plug, as shown in Fig. 1, would be used, the plug being driven in after the air has all been expelled, but while there is still sufficient steam-pressure within the receptacle to prevent air entering.

In each case after a preliminary closure has been effected by driving in the plug or plugs, as above described, the final seal is applied, as before described.

I claim—

1. The herein-described means of effecting a preliminary hermetic closure of tins or other receptacles, consisting essentially of a bush or bung seated in the top or cover of the receptacle and having one or more straight through-passages and one or more branch passages each leading into a straight passage, and of one or more plugs each fitted into a straight through-passage and adapted to be driven therein so as to close the communication through the corresponding branch passage with the vessel, substantially as described.

2. The combination with the herein-described means of effecting a preliminary hermetic closure of tins or other receptacles, consisting of a bush or bung seated in the top or cover of the vessel and having one or more straight through-passages and one or more branch passages each leading into a straight through-passage and one or more plugs each driven in to close the corresponding branch passage as described, of a layer of impermeable material, such as paraffin-wax or melted solder, applied upon and covering the bush, as described.

JOHN R. CROFT.

Witnesses:
 WM. T. CLARK,
 T. W. KENNARD.